(No Model.)
R. G. WOOD.
TWO WHEELED VEHICLE.
No. 288,538. Patented Nov. 13, 1883.
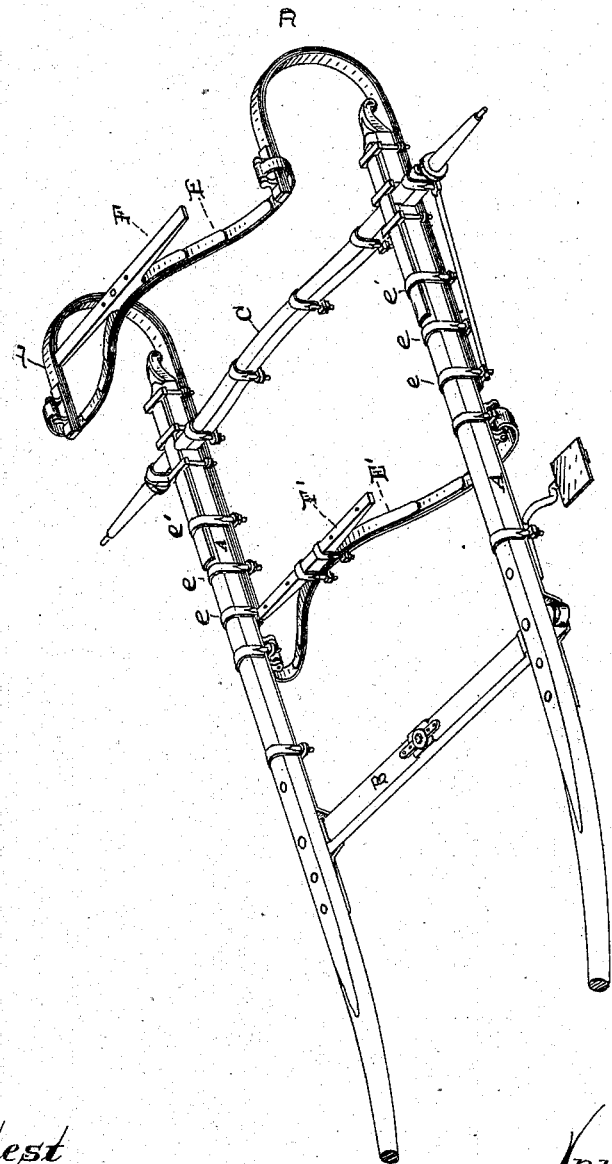
Attest
E. D. Payne
Jacob J. Gessert
Inventor
Richard G. Wood
By Geo. J. Murray
Atty.

UNITED STATES PATENT OFFICE.

RICHARD G. WOOD, OF CINCINNATI, OHIO, ASSIGNOR TO THE CINCINNATI SULKY BUGGY COMPANY, OF SAME PLACE.

TWO-WHEELED VEHICLE.

SPECIFICATION forming part of Letters Patent No. 288,538, dated November 13, 1883.

Application filed April 17, 1883. (No model.)

*To all whom it may concern:*

Be it known that I, RICHARD G. WOOD, a citizen of the United States, residing at Cincinnati, county of Hamilton, State of Ohio, have invented certain new and useful Improvements in Two-Wheeled Vehicles, of which the following is a specification.

My invention relates to two-wheeled vehicles, and particularly to a means of supporting the bodies. Its object is mainly to prevent the transmission of the motion of the horse to the body of the vehicle.

With this object in view my invention consists in a peculiar spring, which is attached underneath the shafts or some object which is supported by or connected to the axle, and which curves upward above the axle to support the body.

The invention will be first fully described in connection with the accompanying drawing, which is a perspective view of a pair of coupé-shafts provided with my improvements, and will then be particularly pointed out in the claims.

In the drawing, A are the shafts, provided with the draft-bar B, and clipped to the axle C in the usual manner.

D D are my improved springs, which in the drawing are shown with three leaves, but may be made of any number. They are secured underneath the shafts and in front of the axle by clips $e\ e\ e'$, and extending back to the rear of the axle and shaft ends curve upward to receive the spring E, upon which is secured the body-supporting bar F. The springs E are curved around underneath the shafts, and the upper ends of the springs D, in connection with my improved springs, give a very easy motion to the body; but the main object of my invention would be attained if the body rested directly upon the springs D, or a transverse bar extending across them, as the essential feature of the invention is the J-shaped spring, having its lower arm extended and attached underneath the shaft or some part of the running-gear, so that the spring may have free play between its end, the part of attachment to the body, and the clip $e'$. I thus obtain a considerable length of spring and considerable spring motion, and at the same time economize space, as the requisite spring action is obtained without elevating the body to an inconvenient height. By attaching the spring below the shaft, as shown, the motion of the horse, which has heretofore been very annoying in this class of vehicles, is not perceptibly felt by the occupant.

While my invention is especially applicable to two-wheeled vehicles, it is evident that it may also be used with advantage on four-wheeled vehicles.

What I claim as new, and desire to secure by Letters Patent, is—

1. The combination, substantially as described, of the body-supporting springs, as D, having lower extended arms, with the shafts or running-gear of a vehicle such as described, the said lower arms being so secured beneath said shafts or gear as to have free play in advance of the axle and of the curved portion which turns upward to support the body.

2. The combination, substantially as described, of the shafts A and spring D, said spring being secured underneath the shafts, in front of the axle, and extending rearward underneath the shaft and axle to the rear of the running-gear, and from there curving upward to support the body, as shown and described.

RICHARD G. WOOD.

Witnesses:
GEO. J. MURRAY,
L. H. PUMMILL.